(12) United States Patent
Okuhara et al.

(10) Patent No.: US 7,699,340 B2
(45) Date of Patent: Apr. 20, 2010

(54) AIR BAG APPARATUS

(75) Inventors: Masaaki Okuhara, Aichi-ken (JP);
Tadashi Yamamoto, Aichi-ken (JP);
Takashi Shigemura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/314,386

(22) Filed: Dec. 9, 2008

(65) Prior Publication Data

US 2009/0134607 A1 May 28, 2009

Related U.S. Application Data

(63) Continuation-in-part of application No. 11/905,872, filed on Oct. 5, 2007, now abandoned.

(30) Foreign Application Priority Data

Oct. 10, 2006 (JP) .............................. 2006-276394

(51) Int. Cl.
*B60R 21/16* (2006.01)

(52) U.S. Cl. ................................. 280/728.2
(58) Field of Classification Search ............. 280/728.2, 280/730, 736, 740, 730.2
See application file for complete search history.

(56) References Cited

U.S. PATENT DOCUMENTS

| 5,611,563 | A | * | 3/1997 | Olson et al. ............... 280/728.2 |
| 5,687,988 | A | * | 11/1997 | Storey et al. ............. 280/728.2 |
| 5,899,485 | A | | 5/1999 | Folsom et al. |
| 6,224,089 | B1 | | 5/2001 | Uchiyama et al. |
| 6,543,803 | B1 | | 4/2003 | Harada et al. |
| 6,783,148 | B2 | | 8/2004 | Henderson |
| 6,837,513 | B2 | | 1/2005 | Oka et al. |
| 6,976,700 | B2 | | 12/2005 | McCann et al. |
| 7,090,243 | B2 | | 8/2006 | Igawa |
| 7,354,062 | B2 | | 4/2008 | Heigl |
| 7,364,194 | B2 | * | 4/2008 | Mabuchi et al. ............. 280/741 |
| 7,384,062 | B2 | * | 6/2008 | Yokoyama et al. ....... 280/730.2 |

FOREIGN PATENT DOCUMENTS

JP    A-2005-104176    4/2005
JP    A-2005-170362    6/2005

* cited by examiner

*Primary Examiner*—Paul N Dickson
*Assistant Examiner*—Robert A Coker
(74) *Attorney, Agent, or Firm*—Posz Law Group, PLC

(57) ABSTRACT

According to the air bag apparatus, for example, a side air bag apparatus 20, in a mode in which a portion on a side of a connector portion 33 of an inflator 30 is exposed from a cylindrical portion 51 of a retainer 50, the inflator 30 is contained in the retainer 50. Further, an exposed portion of the inflator 30, that is, a portion thereof exposed from the cylindrical portion 51 of the retainer 50 is fastened together with an extended portion 52 substantially in a shape of a half cylinder extended from the cylindrical portion 51 of the retainer 50 by a clamp mechanism 60 in a state of being covered by an extraneous portion of a base cloth extended from an opening portion 41 of the air bag 40.

9 Claims, 8 Drawing Sheets

AIR BAG APPARATUS

CROSS REFERENCE TO RELATED APPLICATION

This application is a continuation-in-part of U.S. application Ser. No. 11/905,872, which was filed on Oct. 5, 2007. The parent application (application Ser. No. 11/905,872) is incorporated herein by reference.

BACKGROUND OF THE INVENTION

The present invention relates to an air bag apparatus in which an inflator constituting a gas generating source is inwardly mounted to an air bag, and the air bag is expanded to develop by a gas injected from the inflator.

In the background art, as an air bag of this kind, there is an apparatus described in, for example, Japanese patent application JP-A-2005-170362. That is, according to the air bag apparatus, first, a retainer in a cylindrical shape having a diameter slightly larger than that of an inflator is arranged at inside of the air bag. One end portion in a longitudinal direction of the retainer is exposed to outside of the air bag from an opening portion formed at the air bag, and the inflator is inserted to an inner side of the retainer in the contained state. Further, the inflator is fixed to an end portion of the retainer projected from the air bag by calking. By providing the inflator at the air bag in this way, the air bag is avoided from being damaged in an operation of calking the inflator.

When the inflator is provided in such a mode, since the retainer is projected to outside of the air bag, and therefore, a gas flowing into the air bag through a gap between the retainer and the air bag flows out. Further, depending on the air bag apparatus, there is present an air bag having a specification in which a request for an inner pressure of the air bag is set to be higher than normal, and therefore, in such a case, the flowing out of a gas cannot be disregarded. Although there is also proposed a constitution of pressing the opening portion along with the inflator by a tongue piece extended from the opening portion of the air bag as in an air bag apparatus described in Japanese patent application JP-A-2005-104176 in order to restrain the gas from flowing out, even in such a constitution, only a portion of the opening is closed, and therefore, there still remains a room for improvement.

SUMMARY OF THE INVENTION

The invention has been carried out in view of the above-described actual situation and it is an object thereof to provide an air bag apparatus capable of maintaining an inner pressure in expanding to develop an air bag at a high level by preferably restraining a gas from flowing out from the air bag even in a constitution of containing an inflator in a cylindrical retainer.

In order to resolve the problem, the invention described in a first aspect of the invention constitutes a gist thereof by an air bag apparatus, wherein in a mode in which a portion of an inflator on a side of being provided with a harness is exposed from a retainer in a cylindrical shape, the inflator is contained in the retainer, and a portion of being exposed from the retainer of the inflator contained at a base end portion of an air bag is fastened together with the retainer by fastening means in a state of being covered by a base cloth of the air bag extended from an opening of the air bag.

According to the constitution, in a state of being directly covered by the base cloth extended from the opening of the air bag, the inflator is fastened together with the base cloth by the fastening means, and therefore, an extraneous portion of the base cloth is constituted by a form of closing also a gap between the inflator and the retainer and a seal performance of a total of the air bag is promoted. Therefore, also a gas from the air bag is restrained from flowing out by itself, and an inner pressure in expanding to develop the air bag can be maintained at a high level.

The invention described in a second aspect of the invention constitutes a gist thereof by that the retainer is provided with a portion extended in correspondence with the portion of exposing the inflator, and the extended portion of the retainer is fastened together with the inflator by the fastening means in the state of being covered by the base cloth of the air bag.

According to the constitution, also the extended portion from the retainer is interposed at the portion of fastening together the air bag and the inflator. That is, by fastening together also the retainer containing the inflator, a performance of holding the inflator at inside of the air bag is further stabilized.

The invention described in a third aspect of the invention constitutes a gist thereof by that the portion of the retainer fastened together with the inflator by the fastening means is provided with a slit for assisting to fasten the base cloth of the air bag and the inflator by the fastening means.

According to the constitution, by fitting the fastening means to the slit formed at the retainer, even when a strong force is operated to the fastening means in expanding the air bag, the fastening means is difficult to be detached from the retainer. Therefore, a strength of respectively fastening the inflator and the air bag and the extended portion of the retainer is made to be solid and the inflator can be held further stably.

The invention described in a fourth aspect of the invention constitutes a gist thereof by that a terminal portion of the cylindrical portion of the retainer is provided with a flange for preventing the inserted inflator from being drawn, and a front end portion of the extended portion of the retainer is provided with a calking piece for preventing the inserted inflator from being drawn in a reverse direction by calking.

According to the constitution, when the inflator is inserted to the cylindrical portion, positioning at the terminal end is pertinently carried out by the flange, by providing also the calking piece, the inflator is firmly prevented from being drawn from the retainer on both sides of an inserting direction side and a reverse direction side.

The invention described in a fifth aspect of the invention constitutes a gist thereof by that the cylindrical portion of the retainer is formed with a pressing portion for pressing the inflator by being projected in an inner direction of the cylinder, the inflator is press-fitted to the cylindrical portion of the retainer in a form of elastically deforming the pressing portion.

According to the constitution, by pressing the inflator by a force of recovering the elastically deformed pressing portion to an original shape, an attitude of holding the inflator by the retainer is stabilized, and also an accuracy of mounting the inflator to the retainer is maintained to be high. Further, by being combined with the invention described in the second aspect of the invention through the fourth aspect of the invention, by fastening the inflator together with the portion extended from the cylindrical portion of the retainer, even when play is brought about between the cylindrical portion of the retainer and the inflator, by so-to-speak principle of a lever constituting a force point by the fastening together portion by the fastening means, the inflator is pressed to the cylindrical portion of the retainer, and the attitude of holding the inflator by the retainer is helped to stabilized.

The invention described in a sixth aspect of the invention constitutes a gist thereof by that the fastening means comprises a clamp mechanism subjected to calking.

According to the constitution, by contracting the diameter of the clamp mechanism, the inflator and the air bag can firmly be fastened together.

According to the air bag apparatus of the invention, although the inflator is constituted to be contained in the retainer in the cylindrical shape, the inner pressure in being expanded to develop can be maintained at a high level by preferably restraining the gas from the air bag from flowing out.

DETAILED DESCRIPTION OF THE PREFERRED EMBODIMENTS

An explanation will be given of an embodiment of embodying an air bag apparatus according to the invention in a side air bag apparatus in reference to FIG. 1 through FIG. 8 as follows. Further, in the following description, an explanation will be given by constituting a direction of moving forward a vehicle as a front direction (vehicle front direction) and an explanation will be given by constituting a direction of moving rearward a vehicle as a rear direction (vehicle rear direction). An up and down direction in the following description designates an up and down direction of the vehicle, a left and right direction designates a vehicle width direction of the vehicle which coincides with a left and right direction in moving forward the vehicle.

Figure 1:
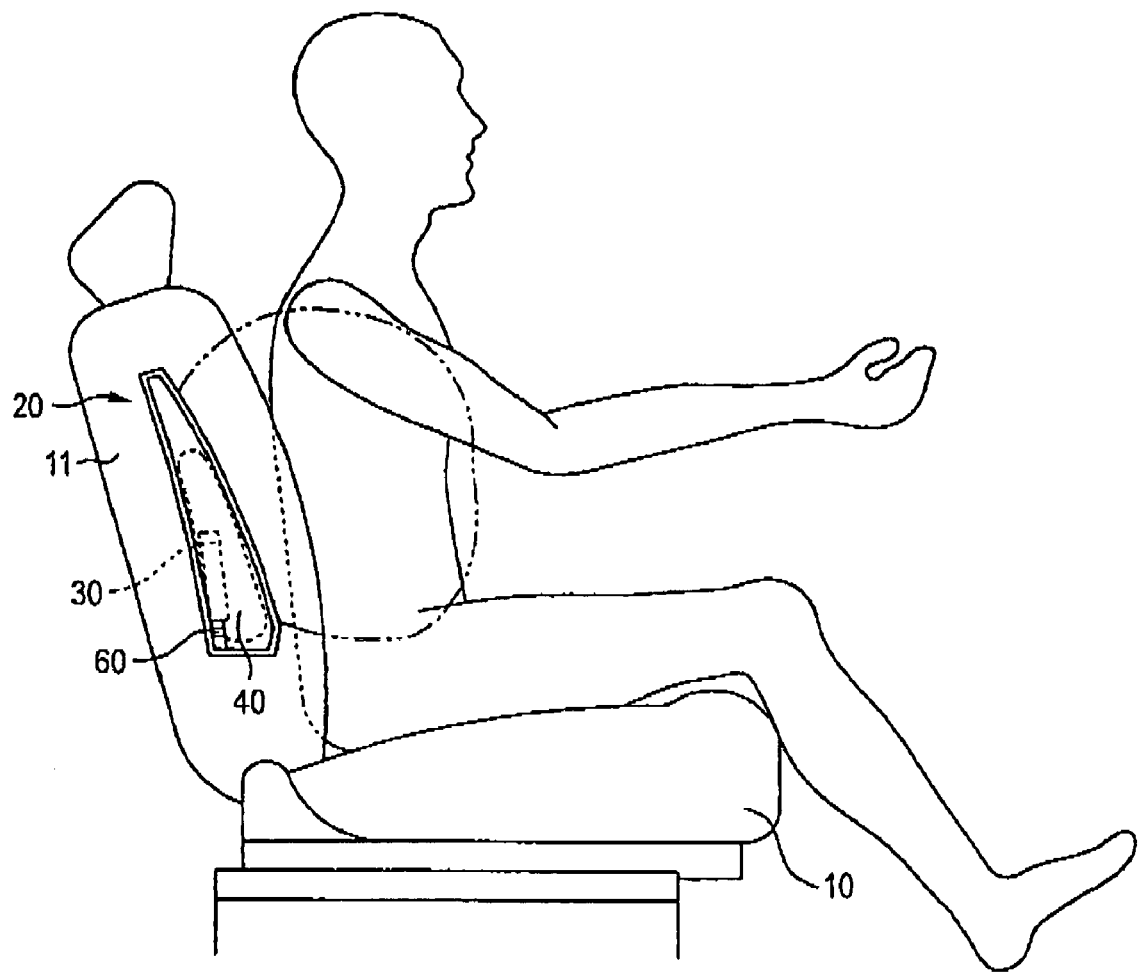
FIG. 1 is a side view showing a mode of arranging an embodiment of an air bag apparatus according to the invention to a vehicle.
Figure 2:
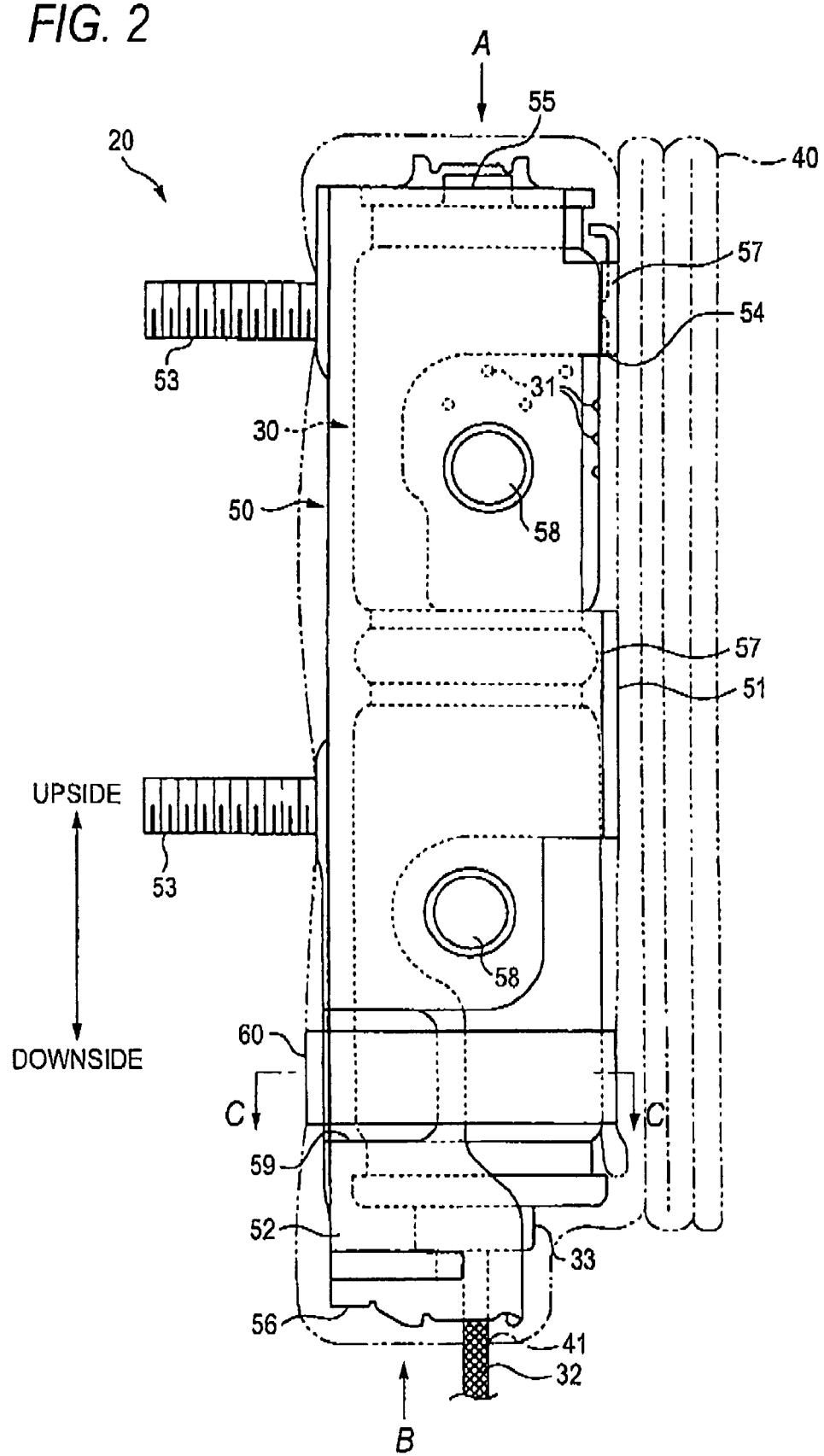
FIG. 2 is a front view enlarging to show a portion of the air bag apparatus of the embodiment.

FIG. 1 shows a state of expanding to develop an air bag of a side air bag apparatus at inside of a vehicle compartment along with a seat and a passenger seated on the seat, and FIG. 2 enlarges to show an air bag module comprising an inflator and an air bag.

As shown by FIG. 1, inside of the vehicle compartment is provided with a seat 10 and a seat bag 11, and a side air bag apparatus 20 is mounted to be contained at a side portion of the seat bag 11. The side air bag apparatus 20 is constituted such that a gas is injected from an inflator 30 into an air bag 40 upon a timing of detection of an impact to a side portion (not illustrated) of the vehicle by an impact detecting sensor (not illustrated) to expand to develop the air bag 40 between the passenger P seated on the seat 10 and a side wall portion (not illustrated) of the vehicle. By expanding to develop the air bag 40 by such a mode, contact of the passenger P and the side wall portion is restrained and the impact to the passenger P is also alleviated.

Further, as enlarging to show the side air bag apparatus 20 in FIG. 2, the inflator 30 is contained at inside of the air bag 40 in a state of being inserted to inside of a retainer 50. The inflator 30 is formed in a shape of a cylinder both ends of which are closed and at inside of which a gas generating agent constituting a source of generating a gas to be filled in the air bag 40 is contained, and the gas generating agent is ignited upon a timing of detection of an impact to the vehicle. Further, an end portion (upper end portion in the drawing) of the inflator 30 constituting a gas generating side is formed with a plurality of gas injecting ports 31 for injecting the generated gas into the air bag 40. On the other hand, an end portion of an opposed side (lower side in the drawing) of the inflator 30 is formed with a connector portion 33 connected with a harness 32 constituting a wiring of applying a control signal to the inflator 30. Further, as shown by FIG. 2, the inflator 30 is arranged such that the end portion on the side of forming the gas injecting port 31 is disposed on an upper side of the vehicle, the end portion on the side of providing the connector portion 33 is disposed on a lower side of the vehicle, and an axis line in a longitudinal direction thereof is extended in the up and down direction.

Further, the air bag 40 is formed in a bag-like shape to be able to contain the inflator 30 at inside thereof, and an opening portion 41 of the inflator 30 from which a harness 32 is led out is provided on a lower side of a base end portion (a portion at which the inflator 30 is contained and which is attached to the seat bag 11). The harness 32 connected to the inflator 30 is led out from the opening portion 41 to outside of the air bag 40. Further, the air bag 40 formed in this way is contained at inside of the seat bag 11 (refer to FIG. 1) in a folded state.

On the other hand, the retainer 50 comprises an ordinary metal material and is constituted by a structure of including a cylindrical portion 51 in a shape of a cylinder both ends of which are considerably opened and an extended portion 52 substantially in a shape of a half cylinder extended from an end portion of the cylindrical portion 51. Further, 2 pieces of bolts 53 for fixing the retainer 50, and the inflator 30 inserted into the retainer 50 and the air bag 40 to inside of the seat bag 11 are led out from the cylindrical portion 51 thereamong.

Here, both ends in an axial direction of the cylindrical portion 51 are opened, and a gas flow out port 54 is opened at a peripheral wall disposed on an upper side when mounted to the seat bag 11. The gas flow out port 54 is for making the expanding gas from the gas injecting port 31 of the inflator 30 flow to inside of the air bag 40 and the retainer 50 per se is mounted such that the gas flow out port 54 is disposed on a front side of the vehicle. Thereby, a gas flows into the air bag 40 to the front side of the vehicle and the air bag 40 is expanded to develop to the front side of the vehicle.

Further, at a terminal end portion of the cylindrical portion 51, that is, an end portion thereof on a side of forming the gas flow out port 54, there is provided a positioning flange 55 brought into contact with the end face of the inflator 30 to prevent the inflator 30 from being drawn out when the inflator 30 is inserted from the other end portion of the cylindrical portion 51. Further, in correspondence with the positioning flange 55, a front end of the extended portion 52 is provided with a calking piece 56 calked by a mode of capable of being brought into contact with the connector portion 33 of the inflator 30 in order to prevent the inflator 30 inserted to the cylindrical portion 51 from being drawn out in a direction reverse to the direction of inserting the inflator 30. Further, the terminal end portion of the retainer 50 and the front end portion of the extended portion 52 are opposed to each other.

Further, the peripheral wall of the cylindrical portion 51 is provided with a pressing portion 57 and a bead 58 portions of which are projected to deform to an inner side and which press the inserted inflator 30. By providing the pressing portion 57 and the bead 58, an outer peripheral face of the inflator 30 is brought into contact with the pressing portion 57 and the bead 58 in accordance with inserting the inflator 30 to inside of the cylindrical portion 51. That is, when the inflator 30 is inserted to inside of the cylindrical portion 51, particularly, with regard to the pressing portion 57, the inflator 30 is press-fitted to the pressing portion 57 while being elastically deformed to deform to an outer side of the cylindrical portion 51. Therefore, in a state of containing the inflator 30 in the cylindrical portion 51, the inflator 30 is held by a force of recovering the elastically deformed pressing portion 57 to an original shape.

On the other hand, the extended portion 52 is provided with a slit 59 formed by notching a portion thereof along with the calking piece 56 and a clamp mechanism 60 explained below is fastened in correspondence with a portion of providing the slit 59.

Figure 8:
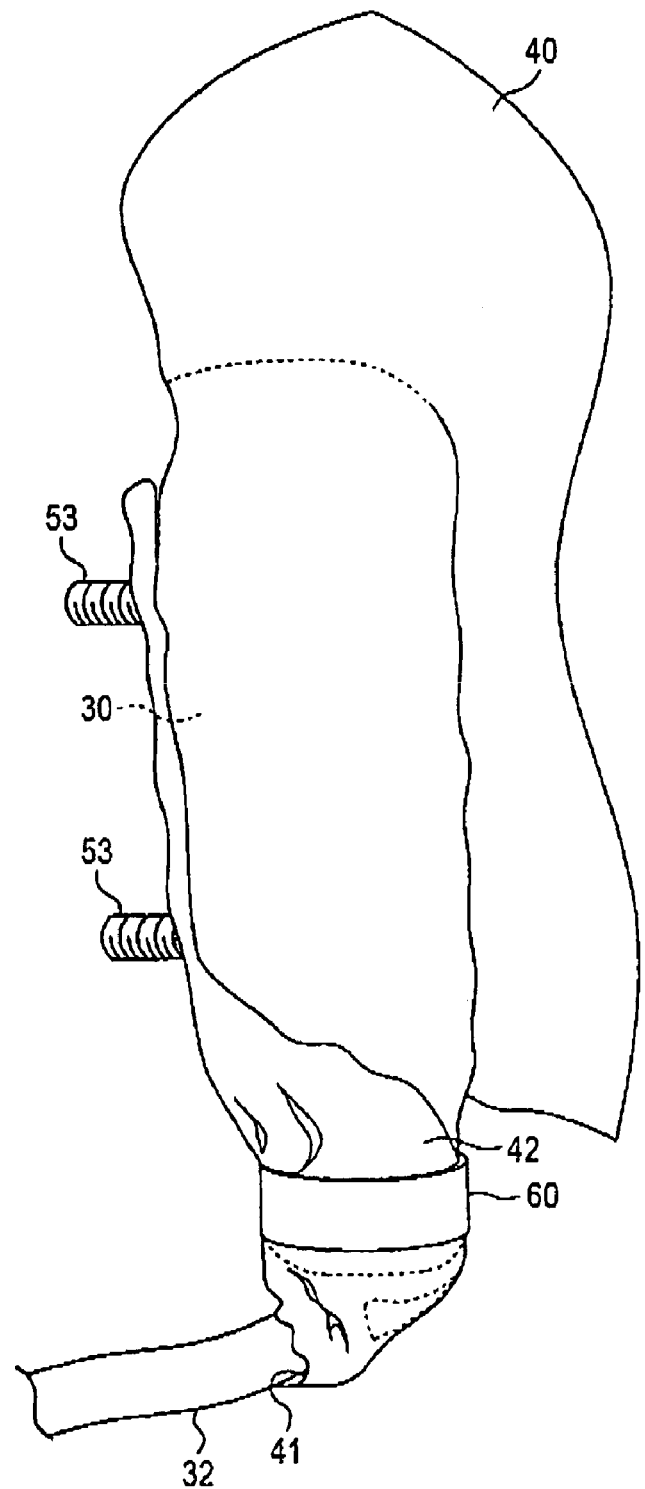
FIG. 8 is a perspective view showing a state of making the air bag wrapped on the inflator and the retainer and fastened by a clamp mechanism in the air bag apparatus of the embodiment.

That is, when the inflator 30 is contained in the retainer 50 constituted in this way, since the extended portion 52 extended from the cylindrical portion 51 is formed in the shape of the half cylinder, a portion of the inflator 30 is brought into an exposed state at the portion. Further, the exposed portion of the inflator 30 and the extended portion 52 are covered by the air bag 40 in the form of leading out the harness 32 from the opening portion 41 of the air bag 40. Hence, according to the embodiment, as shown by FIG. 8 mentioned later, in a state of folding back a hermetically sealed portion 42 constituting an extraneous portion of a base cloth of the air bag 40 at a vicinity of the opening portion 41 inserted with the harness 32 to a side of the inflator 30, the clamp mechanism 60 is fastened to a position in correspondence with the slit 59 formed at the extended portion 52 to thereby fasten the inflator 30 together with the air bag 40 and the extended portion 52 of the retainer 50. Further, the hermetically sealed portion 42 is formed with a hole at a position in correspondence with the bolt 53 and mounted to inside of the seat bag 11 in a state of inserting the bolt 53 through the hole. Therefore, an end face of the inflator 30 is pressed also by the hermetically sealed portion 42.

Figure 3:
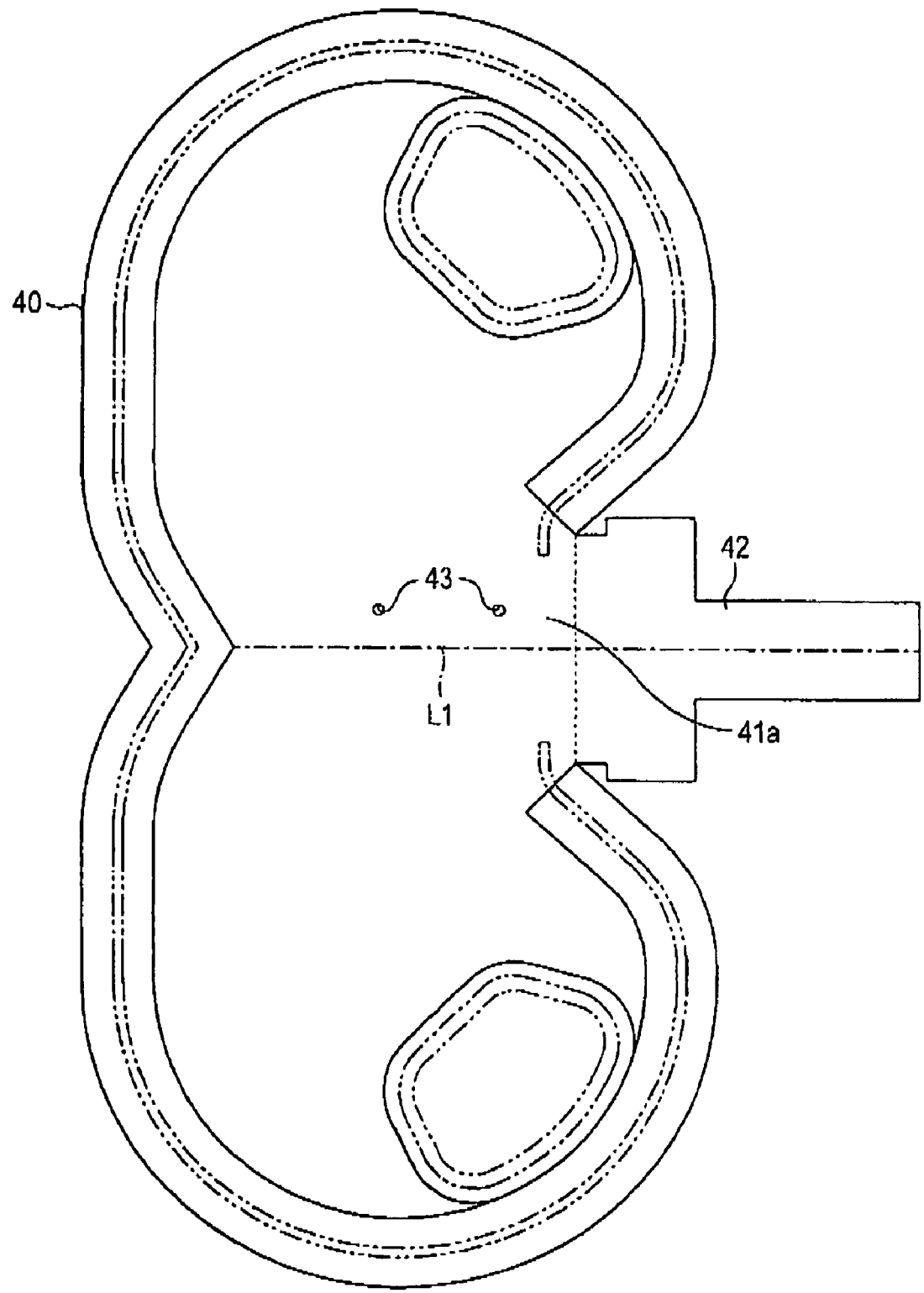
FIG. 3 is a front view showing a state before the air bag constituting the air bag apparatus of the embodiment is formed in a bag-like shape.
Figure 4:
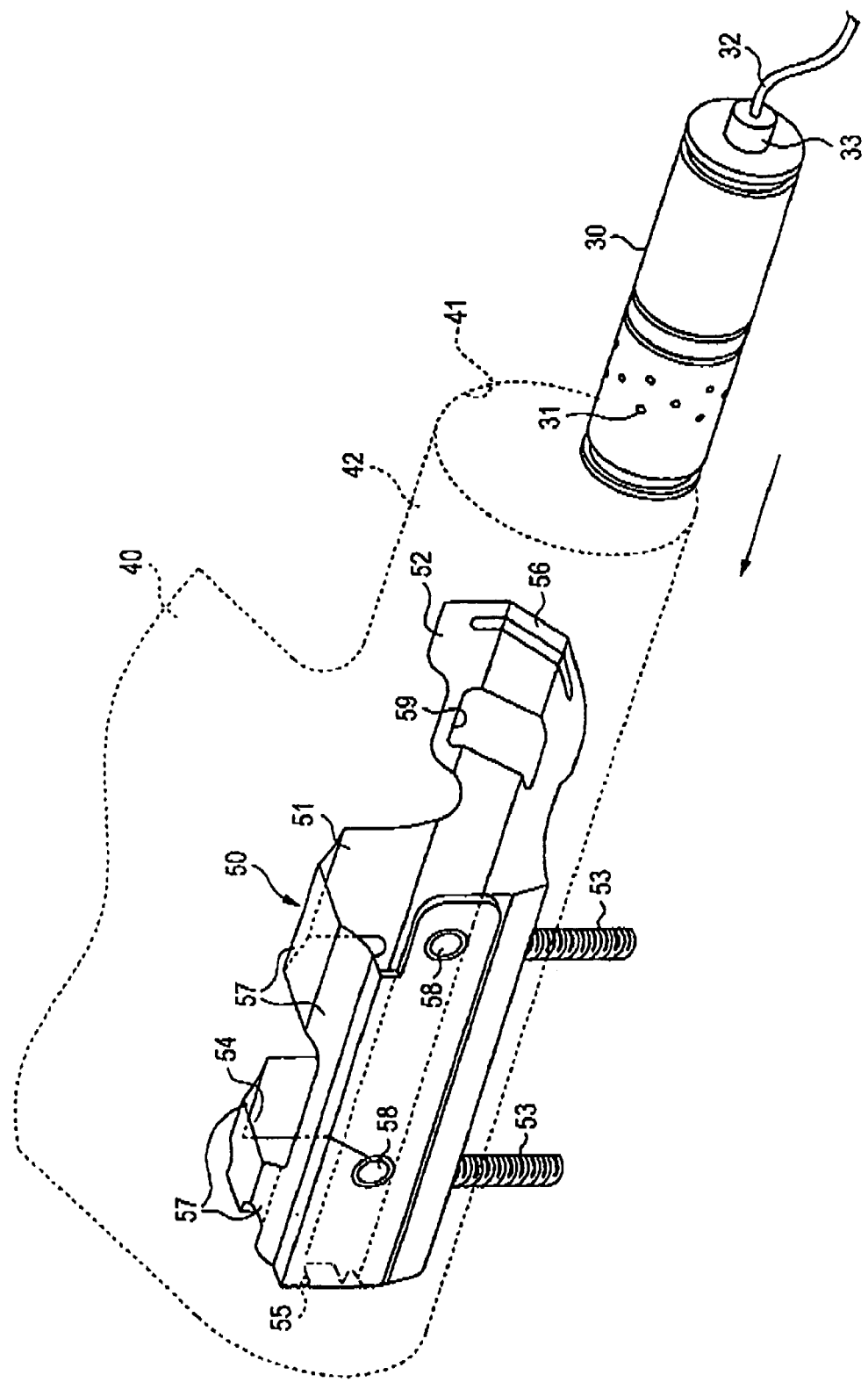
FIG. 4 is a perspective view showing a mode of inserting an inflator to a retainer in the air bag apparatus of the embodiment.
Figure 5:
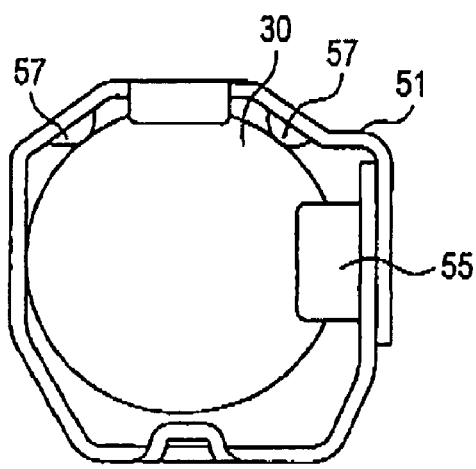
FIG. 5 is a side view showing structures of side faces of the inflator and the retainer viewed from an arrow mark A direction in FIG. 2 of the air bag apparatus of the embodiment.
Figure 6:
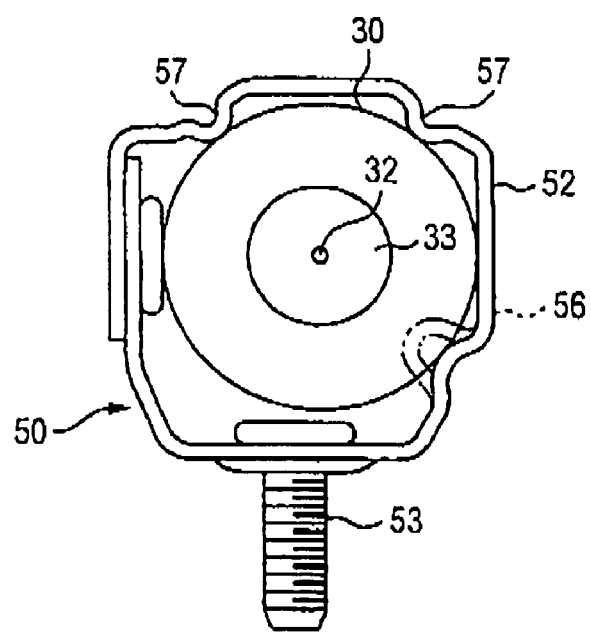
FIG. 6 is a side view showing the structures of side faces of the inflator and the retainer viewed from an arrow marl B direction in FIG. 2 of the air bag apparatus of the embodiment.

Next, an explanation will be given of a procedure of containing the inflator 30 to the air bag 40 along with the retainer 50 in the side air bag apparatus 20 constituted in this way also in reference to FIG. 3 through FIG. 7. FIG. 3 shows a state before the air bag 40 is sewn in the bag-like shape, and FIG. 4 shows a mode of inserting the inflator 30 into the retainer 50. Further, FIG. 5 shows structures of side faces of the retainer 50 and the inflator 30 viewed from an arrow mark A direction in FIG. 2, and FIG. 6 shows structures of side faces of the retainer 50 and the inflator 30 viewed from an arrow mark B direction of FIG. 2. Further, FIGS. 7 (a) through (d) show a fastening procedure by the clamp mechanism 60 of the inflator 30. Further, FIG. 8 shows a state after the air bag 40 is made to wrap on the inflator 30 contained in the retainer 50 and fastened by the clamp mechanism 60. Further, in FIG. 5, FIG. 6, illustration of the airbag 40 is omitted for convenience of explanation.

First, as shown by FIG. 3, the base cloth of the air bag 40 is formed symmetrically in a left and right direction centering on an axis line L1 and is formed in the bag-like shape by being folded back at the axis line L1 and sewn along a line indicated by two-dotted chain line in FIG. 2 mentioned above. Further, a center region 41a is not sewn, and therefore, the region is opened when the air bag 40 is formed into the bag-like shape to form the opening portion 41 (refer to FIG. 2). Further, the hermetically sealed portion 42 is extended to form from the center region 41a to constitute the extraneous portion of the base cloth. Further, the air bag 40 is provided with a pair of insertion holes 43 to be inserted with the bolts 53 led out from the retainer 50, and after sewing the air bag 40, the bolts 53 are inserted into the insertion holes 43 to contain the retainer 50 at inside of the air bag 40.

Successively, in a mode shown in FIG. 4, actually, the inflator 30 is inserted into the retainer 50 through the opening portion 41 of the air bag 40. In the inserting, as described above, the inflator 30 is pressed-fitted into the cylindrical portion 51 while elastically deforming the pressing portion 57 of the retainer 50. By inserting the inflator 30 in this way, as will be shown in FIG. 5, a front end face of the inflator 30 is brought into contact with the positioning flange 55 formed at the terminal end portion of the cylindrical portion 51 to position the inflator 30. Further, thereafter, successively, by a mode shown in FIG. 6, by calking the calking piece 56 provided at the extended portion 52 of the retainer 50 as indicated by a two-dotted chain line in the drawing, the inserted inflator 30 is restricted so as not to be drawn in the direction reverse to the inserting direction. Further, in the calking, the opening portion 41 of the air bag 40 is not closed, and therefore, the calking operation is carried out at inside of the air bag 40 to prevent a pressure by the calking from being operated directly to the air bag 40.

Figure 7:
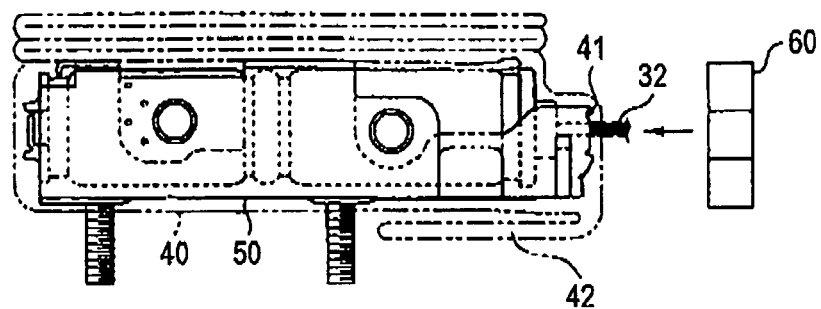
FIG. 7 (*a*) through (*d*) are operation views showing a fastening procedure by a clamp mechanism of the inflator in the air bag apparatus of the embodiment.
Figure 7:
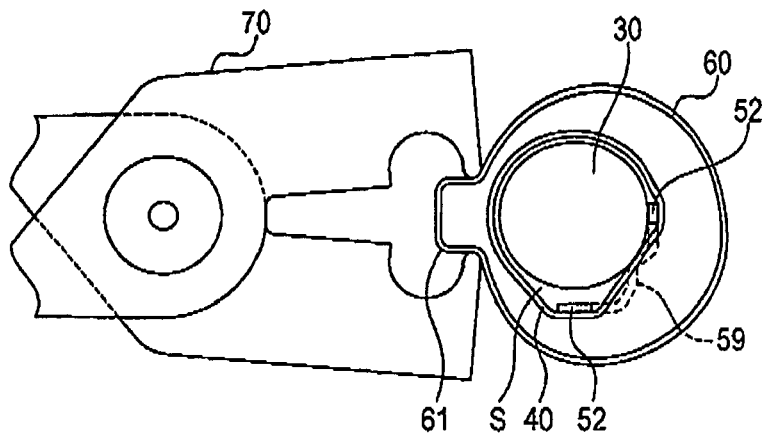
Figure 7:
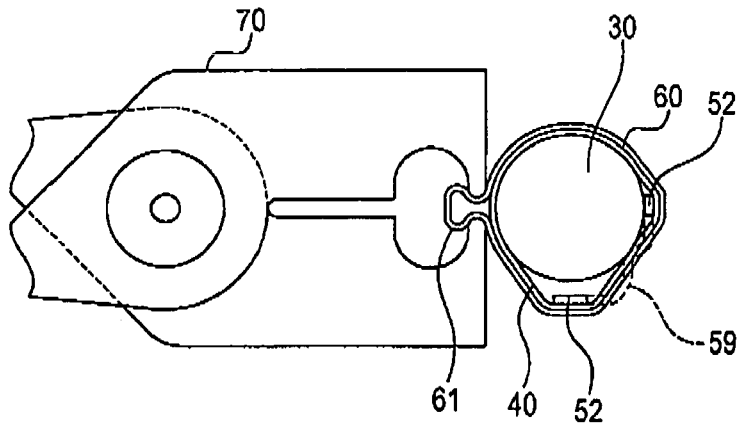
Figure 7:
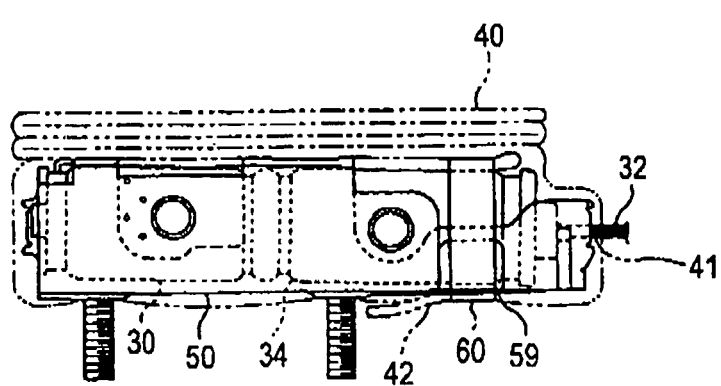

Under the state, surroundings of the portion exposed from the cylindrical portion 51 of the inflator 30 and the harness 32 connected to the connector portion 33 are covered by the hermetically sealed portion 42 (refer to FIG. 3). Further, as shown by FIG. 7 (a), a portion of the hermetically sealed portion 42 longer than the inflator 30 is folded back to the inflator 30 to close the opening portion 41 of the air bag 40 and the clamp mechanism 60 is inserted to be fitted to the inflator 30 and the retainer 50 to press the folded back portion. In a state of inserting to fit the clamp mechanism 60, as shown by FIG. 7 (b), a gap S is formed between the air bag 40 and the inflator 30. Further, a diameter of a circular ring portion 62 of the clamp mechanism 60 is contracted by pressing a diameter contracted portion 61 of the clamp mechanism 60 from both sides by a calking machine 70 to fasten together the air bag 40 and the inflator 30. Thereby, as shown by FIG. 7 (c), the gap between the inflator 30 and the air bag 40 is closed, and also a gas from the air bag 40 is restrained from flowing out when the air bag 40 is expanded to develop. Here, a portion of the clamp mechanism 60 is inserted into the slit 59, and at least a part of the air bag 40 is located in the slit 59. Further, at least a part of the thickness direction of the clamp mechanism 60 may be located in the slit 59.

That is, under the state, as shown by FIG. 8, a portion of communicating with outside of the air bag 40 is only the opening portion 41 from which the harness 32 is led out, the hermetically sealed portion 42 is pressed by the clamp mechanism 60 to close other gap. Further, the inflator 30 is fastened also to the extended portion 52 along with the air bag 40, and therefore, the inflator 30 is stably held at inside of the air bag 40. Further, by fitting the clamp mechanism 60 and the slit 59 formed at the extended portion 52 of the retainer 50, the clamp mechanism 60 and the slit 59 are engaged and even when a strong force is operated to the clamp mechanism 60 in expanding the air bag 40, the clamp mechanism 60 is made to be difficult to be detached from the retainer 50. Further, when the inflator 30 is displaced in a direction indicated by an arrow mark L2 in FIG. 7 (c) by fastening of the clamp mechanism 60, as shown by FIG. 7 (d), by constituting a force point by the fastening portion, constituting a fulcrum by a middle portion 34 of the inflator 30, by a principle of a lever, an outer peripheral face of the inflator 30 is pressed to the cylindrical portion 51 of the retainer 50, for example, the pressing portion 57, a mode of arranging at inside of the retainer 50 is changed. Thereby, also an attitude of holding the inflator 30 by the retainer 50 is helped to stabilize further.

As explained above, according to the air bag apparatus of the embodiment, the following effects can be achieved.

(1) There is constituted a structure in which in a state of being directly covered by the hermetically sealed portion 42 constituting the extraneous portion of the base cloth extended from the opening portion 41 of the air bag 40, the inflator 30 is fastened by the clamp mechanism 60 together with the hermetically sealed portion 42. Thereby, the form of closing also the gap between the inflator 30 and the retainer 50 by the extraneous portion of the air bag 40 is constituted to promote a seal performance of a total of the air bag. Therefore, the gas from the air bag 40 is restrained from flowing out by itself and an inner pressure in expanding to develop the air bag 40 can be maintained at a high level.

(2) The retainer 50 is provided with the extended portion 52 in correspondence with the portion of exposing the inflator 30 and the extended portion 52 is fastened together with the inflator 30 by the clamp mechanism 60 in the state of being covered by the hermetically sealed portion 42 of the air bag 40. By such a structure, the portion of fastening together the air bag 40 and the inflator 30 are also interposed by the extended portion 52. That is, by fastening together also the portion of the retainer 50 at which the inflator 30 is contained, a performance of folding the inflator 30 at inside of the air bag 40 is stabilized.

(3) The portion of the retainer 50 fastened together with the inflator 30 by the clamp mechanism 60 is provided with the slit 59 for assisting to fasten the base cloth of the air bag 40 and the inflator 30 by the clamp mechanism 60. By fitting the clamp mechanism 60 to the slit 59 so that a portion of the clamp mechanism 60 is inserted into the slit 59 and/or a portion of the air bag 40 is inserted in to the slit 59, even when a strong force is operated to the clamp mechanism 60 in expanding the air bag 40, the clamp mechanism 60 is made to be difficult to be detached from the retainer 50. Therefore, a strength of respectively fastening the inflator 30 and the air bag 40, and the extended portion 52 of the retainer 50 is made to be further solid and the inflator 30 can be held further stably.

(4) The terminal end portion of the cylindrical portion 51 of the retainer 50 is provided with the positioning flange 55 for preventing the inserted inflator 30 from being drawn out, and the front end portion of the extended portion 52 of the retainer 50 is provided with the calking piece 56 for preventing the inserted inflator 30 from being drawn in the reverse direction by calking. Thereby, when the inflator 30 is inserted to the cylindrical portion 51, positioning thereof at the terminal end is made to be carried out pertinently by the positioning flange 55, and by also providing the calking piece 56, the inflator 30 can firmly be prevented from being drawn from the retainer 50 on the both sides of the inserting direction side and the reverse direction side.

(5) The cylindrical portion 51 is formed with the pressing portion 57 and the bead 58 for pressing the inflator 30 by being projected in the inner direction of the cylinder, the inflator 30 is press-fitted to the cylindrical portion 51 in the form of being pressed by the pressing portion 57 and the bead 58. Thereby, the attitude of holding the inflator 30 is stabilized by the retainer 50 and also an accuracy of mounting the inflator 30 to the retainer 50 is maintained to be high. Further, by fastening the inflator 30 together with the extended portion 52 of the retainer 50, even when play is brought about between the cylindrical portion 51 of the retainer 50 and the inflator 30, by a principle of a so-to-speak lever constituting a force point by the fastening together portion by the clamp mechanism 60, the inflator 30 is pressed to the cylindrical portion 51 of the retainer 50. That is, the attitude of holding the inflator 30 is helped to stabilize by the retainer 50.

(6) The inflator 30 is fastened together by the calked clamp mechanism 60. Thereby, the inflator 30 of the air bag 40 are firmly fastened together by contracting the diameter of the clamp mechanism 60.

(7) The portion of the hermetically sealed portion 42 longer than the inflator 30 is folded back and the inflator 30 and the air bag 40 are fastened together along with the portion, and therefore, the retainer 50 can be restrained from being drawn from the retainer 50 by pressing the inflator 30 by the fold back portion.

Further, the embodiment can be embodied also by the following modes constituted by pertinently changing the embodiment.

Although according to the embodiment, the inflator 30 is fastened together by the clamp mechanism 60, the fastening means is selected arbitrarily and means other than the clamp mechanism 60 can be adopted so far as the means is means having a strength of capable of maintaining the fastening state in expanding to develop the air bag 40.

Although according to the embodiment, the hermetically sealed portion 42 is formed with the holes at 2 portions in correspondence with the bolts 53 and the inflator 30 and the like are fixed in the state of inserting the bolts 53 to the holes, there can be adopted a constitution in which the hole is formed only at the position in correspondence with the bolt on the side of the opening portion 41 in the bolts 53 and the bolt is inserted to one of the bolts 53.

Although according to the embodiment, the calking piece 56 is calked by way of the opening portion 41 of the air bag 40, there can also be adopted a method of calking after folding back the portion of the air bag 40 covering the calking piece 56 to expose the calking piece 56 and thereafter returning the folded back portion to an original state.

Although according to the embodiment, the portion of the hermetically sealed portion 42 longer than the inflator 30 is folded back and the inflator 30 and the air bag are fastened together by the clamp mechanism 60 along with the portion, even when a constitution in which the folded back portion is not fastened together by the clamp mechanism 60 is adopted, a gas can be restrained from being leaked from the air bag 40. Further, in this case, when the hole is formed at the folded back portion and the bolt 53 is inserted, an effect in conformity with the (7) can be achieved.

Figure 9:
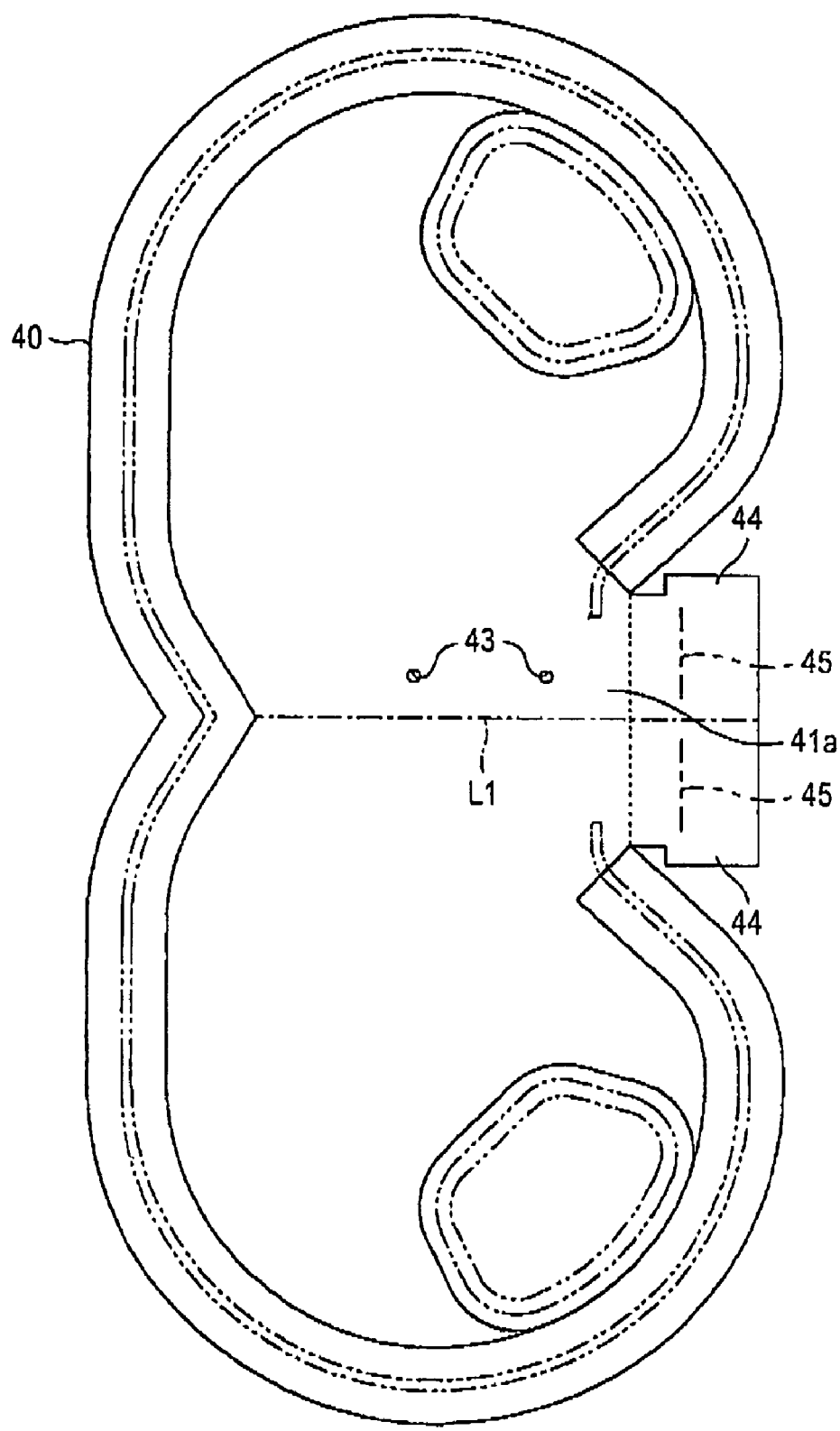
FIG. 9 is a front view showing the air bag without the hermetically sealed portion.

Although according to the embodiment, the portion of the hermetically sealed portion 42 longer than the inflator 30 is folded back and the inflator 30 and the air bag are fastened together by the clamp mechanism 60 along with the portion, even when a constitution in which the hermetically sealed portion 42 to be the feed back portion is not provided as shown in FIG. 9 is adopted, the air back is clamed by the clamping mechanism 60 at a same position as the embodiment and a gas can be restrained from being leaked from the air bag 40. Further, in this case, when projecting portions 44 are formed at the opening portion 41 of the air bag 40, it is possible to prevent the air back 40 from being drawn from the clamp mechanism 60 when the air bag 40 is expanded, and an effect of positioning in time of clamping can be achieved. Further, when portions 45 are sewn, it is possible to prevent the air back 40 from being drawn from the clamp mechanism 60 when the air bag 40 is expanded.

According to the embodiment, the cylindrical portion 51 of the retainer 50 is formed with the pressing portion 57 and the bead 58, and the inflator 30 is inserted into the cylindrical portion 51 of the retainer 50 while pressing the pressing portion 57 and the bead 58, when the cylindrical portion 51 of the retainer 50 is provided with the shape of capable of stably maintaining the attitude of the inflator 30, such a structure may not necessarily be provided to the retainer 50.

Although according to the embodiment, the calking piece 56 is provided at the extended portion 52 as the constitution of preventing the inflator 30 from being drawn out to the side of the direction reverse to the direction of being inserted to the retainer 50, instead thereof, there may be adopted a constitution in which the inflator 30 is prevented from being drawn by pressing an end portion on the opening side of the inflator 30 by a strip-like base cloth extended from a vicinity of the opening of the air bag 40.

Even when the slit 59 is not formed at the extended portion 52 of the retainer 50, in a case of enabling sufficiently solid fastening by fastening means, the slit 59 can be omitted to form to the extended portion 52 of the retainer 50.

As the constitution of the extended portion 52, other than the constitution of the shape of the half cylinder as in the embodiment, the constitution in a plate-like shape can be adopted. In sum, there may be constituted a mode of being exposed without covering an entire periphery of the inflator 30 by the extended portion. Further, even in such a constitution, when a recess portion is formed at the extended portion in the plate-like shape and the clamp mechanism is fastened to the recess portion, the clamp mechanism is engaged with the recess portion to prevent from being drawn from the extended portion, and therefore, the clamp mechanism can solidly be fixed.

When the inflator 30 and the air bag 40 can sufficiently solidly be fastened and the attitude of stably maintaining the inflator 30 can be maintained even when not only the slit 59 but also the extended portion 52 per se of the retainer 50 are not present, the extended portion 52 per se can also be omitted from being arranged to the retainer 50.

Although according to the embodiment, there is exemplified the method of containing the inflator 30 and the retainer 50 into the air bag 40 by way of the opening portion 41, for example, the following method can substitute for the method. That is, a portion on an opposed side of the opening portion 41 of the air bag 40 is left to be opened without being sewn, and the inflator 30 and the like are contained to inside of the air bag 40. Further, the opening can be closed by sewing the portion after having been contained.

Otherwise, a procedure of containing the retainer 50 and the inflator 30 to the air bag 40 is arbitrary, and the retainer 50 previously integrated with the inflator 30 may be contained at inside of the air bag 40. In sum, in a state in which the portion exposed from the retainer of the inflator contained at the base end portion of the air bag along with the retainer is covered by the base cloth of the air bag extended from the opening of the air bag, the portion may be fastened together by the fastening means.

Although according to the embodiment, there is exemplified the example of embodying the air bag apparatus according to the invention at the side air bag apparatus, the invention is also applicable to an air bag apparatus of other kind of, for example, an air bag for the knee or the like.

The invention claimed is:

1. An air bag apparatus in which an inflator is contained in a retainer, and an end of the inflator at which a harness is located is exposed from the retainer, wherein the end of the inflator that is exposed from the retainer is covered by a base end portion of an airbag at an opening of the airbag and is fastened to the retainer by a fastener;

the retainer is provided with an extended portion, which corresponds with the portion of the inflator that is exposed from the retainer, and the extended portion of the retainer is fastened to the inflator by the fastener when the inflator is covered by the air bag; and the extended portion of the retainer, which is fastened to the inflator by the fastener, is provided with a slit, wherein the slit is a hole in the extended portion, and a portion of the fastener is inserted into the hole, to facilitate fastening the base end of the air bag to the inflator with the fastener.

2. The air bag apparatus according to claim 1, wherein the retainer includes a cylindrical portion, and a terminal portion of the cylindrical portion of the retainer is provided with a flange for preventing the inflator from escaping from the retainer, and a front end portion of the extended portion of the retainer is provided with a piece for preventing the inserted inflator from escaping from the retainer.

3. The air bag apparatus according to claim 1, wherein the retainer includes a cylindrical portion and the cylindrical portion of the retainer is formed with a pressing portion for pressing the inflator by being projected in an inner direction of the retainer, so that the inflator is press-fitted to the cylindrical portion of the retainer, and the pressing portion is elastically deformed by the inflator.

4. The air bag apparatus according to claim 1, wherein the fastener comprises a clamp mechanism subjected to crimping.

5. An air bag apparatus comprising:

a retainer, which includes a cylindrical portion and an extended portion, and the extended portion extends in an axial direction from one end of the cylindrical portion;

an inflator, which is contained by the retainer, wherein the inflator has a first end that is exposed from the retainer and is adapted to connect to a harness;

an airbag, which has a base end at which an opening is formed; and a clamp for clamping the base end of the airbag to the inflator, wherein the first end of the inflator is covered by the base portion of an airbag, and the base portion of the airbag is fastened to the retainer by a clamp;

the extended portion corresponds with the first end of the inflator, and the extended portion of the retainer is fastened to the inflator by the clamp when the inflator is covered by the air bag; and an opening is formed in the extended portion of the retainer, and an air bag-pressing section of the clamp is fitted in the opening, such that the air bag-pressing section of the clamp presses the base portion of the airbag against the inflator through the opening to fasten the base end of the air bag to the inflator, and another section of the clamp engages the extended portion.

6. The air bag apparatus according to claim 5, wherein a terminal portion of the cylindrical portion of the retainer is provided with a flange for preventing the inflator from escaping from the retainer, and a front end portion of the extended portion of the retainer is provided with a piece for preventing the inserted inflator from escaping from the retainer.

7. The air bag apparatus according to claim 5, wherein the cylindrical portion of the retainer is formed with a pressing portion for pressing the inflator by being projected in an inner direction of the retainer, so that the inflator is press-fitted to the cylindrical portion of the retainer, and the pressing portion is elastically deformed by the inflator.

8. The air bag apparatus according to claim 5, wherein the opening is spaced from an end of the extended portion.

9. The air bag apparatus according to claim 5, wherein the clamp is a band-like member that is crimped.

* * * * *